United States Patent [19]
Kohara et al.

[11] Patent Number: 5,735,745
[45] Date of Patent: Apr. 7, 1998

[54] HOMOKINETIC UNIVERSAL JOINT HAVING BALL GROOVES IN A CYLINDRICAL PLANE

[75] Inventors: Takeshi Kohara; Hiromichi Bando, both of Iwata; Tatsurou Sugiyama, Haibara-gun; Michio Iihara, Hamamatsu, all of Japan

[73] Assignee: NTN Corporation, Osaka, Japan

[21] Appl. No.: 805,318

[22] Filed: Feb. 24, 1997

Related U.S. Application Data

[63] Continuation of Ser. No. 411,941, Mar. 28, 1995, abandoned.

[51] Int. Cl.$^6$ ................................ F16D 3/205
[52] U.S. Cl. ..................... 464/111; 464/168; 464/905
[58] Field of Search ..................... 464/111, 120, 464/122, 168, 905; 384/43, 45

[56] References Cited

U.S. PATENT DOCUMENTS

| | | | |
|---|---|---|---|
| 1,918,108 | 7/1933 | Jonkhoff | 464/168 |
| 2,503,009 | 4/1950 | Thomson | 384/43 |
| 2,509,749 | 5/1950 | Thomson | 384/43 |
| 2,559,292 | 7/1951 | Ferger | 384/43 |
| 2,983,120 | 5/1961 | White | 464/168 |
| 3,037,821 | 6/1962 | Schutz | 384/43 |
| 3,364,699 | 1/1968 | Hufstedler et al. | 384/43 X |
| 3,673,817 | 7/1972 | Doran et al. | 464/168 |
| 3,719,979 | 3/1973 | Irwin | 384/43 X |
| 4,310,202 | 1/1982 | Teramachi | 464/168 X |
| 4,634,296 | 1/1987 | Watanabe | 464/168 X |
| 4,684,356 | 8/1987 | Kimata et al. | 464/111 |
| 4,741,723 | 5/1988 | Orain | 464/111 |
| 4,840,600 | 6/1989 | White et al. | 464/111 |
| 4,932,793 | 6/1990 | Milanov et al. | 464/168 X |
| 5,061,223 | 10/1991 | Kadota et al. | 464/168 X |
| 5,346,313 | 9/1994 | Ng | 384/43 |
| 5,437,220 | 8/1995 | Cheng et al. | 384/43 X |

Primary Examiner—Daniel P. Stodola
Assistant Examiner—William A. Rivera
Attorney, Agent, or Firm—Nikaido, Marmelstein, Murray & Oram LLP

[57] ABSTRACT

A tripod member having three trunnions is inserted in an outer ring. A guide block is supported on each of the trunnions so as to be pivotable around the trunnion and is formed with a ball circulation groove at each side thereof. A plurality of balls are accommodated in the ball circulation groove so that part of the balls will protrude diametrically outwards from the ball circulation groove. The outer ring is formed in its inner surface with raceway grooves for guiding the balls in an axial direction. An arcuate ball rolling surface and a ball guide surface are formed at both sides of each raceway groove to guide the balls and prevent them from dropping out, respectively.

1 Claim, 5 Drawing Sheets

HOMOKINETIC UNIVERSAL JOINT HAVING BALL GROOVES IN A CYLINDRICAL PLANE

This application is a continuation of application Ser. No. 08/411,941 filed Mar. 28, 1995, now abandoned.

BACKGROUND OF THE INVENTION

This invention relates to a slide type homokinetic universal joint mounted mainly on a front-wheel drive car.

The present applicant proposed a homokinetic universal joint of this type in Unexamined Japanese Patent Publication 3-113123.

The joint proposed in this publication is shown in FIG. 7 and comprises an outer ring 30 having three ribs 31 on the inner surface thereof to define track grooves 32 between the adjacent ribs 31, and a tripod member 33 having three trunnions 34 and mounted in the outer ring 30. A guide block 35 is mounted around each trunnion 34 so as to be pivotable about and slidable along the axis of the trunnion 34. In each side of the guide block 35 is formed a ball circulation groove 36 having straight paths 39 and accommodating a plurality of balls 37. Formed in either side of each track groove 32 is a raceway groove 38 for guiding the balls 37, so as to be parallel to the axis of the track groove.

The guide blocks 35 are always kept horizontal by the balls 37 held between the straight paths 39 of the ball circulation grooves 36 and the raceway grooves 38 of the track grooves 32. While torque is being transmitted with the homokinetic universal joint taking a working angle, the guide blocks 35 move horizontally in the longitudinal direction of the track grooves 32, causing the balls 37 to roll. Thus, the slide resistance of the joint while the joint is taking a working angle can be reduced dramatically.

In this conventional arrangement, the connecting portions of each ball circulation groove 36, through which balls 37 can move from one straight path 39 to the other, face both sides of the corresponding track groove 32. Thus, it is necessary to provide arcuate slopes 40 at the tops of the ribs 31 defining the track grooves 32 to prevent dropout of the balls 37.

To provide such slopes 40, the ridges of the ribs 31 have to be edged sharply. This makes it difficult to form the outer ring by forging.

An object of this invention is to provide a homokinetic universal joint whose outer ring can be formed easily by forging.

SUMMARY OF THE INVENTION

In order to attain this object, this invention provides a homokinetic universal joint comprising an outer ring, a tripod member inserted in the outer ring and having three trunnions on outer periphery thereof, a guide block supported on the each trunnion so as to be inclinable about and axially slidable along the each trunnion, the guide block being formed with a ball circulation groove in both sides thereof, the ball circulation groove accommodating a plurality of balls with part of the balls protruding diametrically outwards from the ball circulation groove, each ball circulation groove having straight paths, the outer ring being formed in its inner surface with raceway grooves for guiding the balls that are moving in the axial straight paths of the ball circulation groove in a direction parallel to the axis of the outer ring.

In the above arrangement, the balls roll radially outwards with respect to the outer ring. This makes it possible to form raceway grooves in the outer ring so as to face radially inwards, and thus to eliminate the need to form slopes on the ribs to prevent the dropout of the balls. Thus, there is no need to form sharp edges on the inner periphery of the outer ring.

There is even no need to form ribs to define track grooves in the outer ring. Thus, the outer ring can be formed from a smaller amount of material. Such an outer ring is less expensive and lighter in weight.

Other features and objects of the invention will become apparent from the following description made with reference to the accompanying drawings, in which:

DETAILED DESCRIPTION OF THE PREFERRED EMBODIMENT

Figure 1:
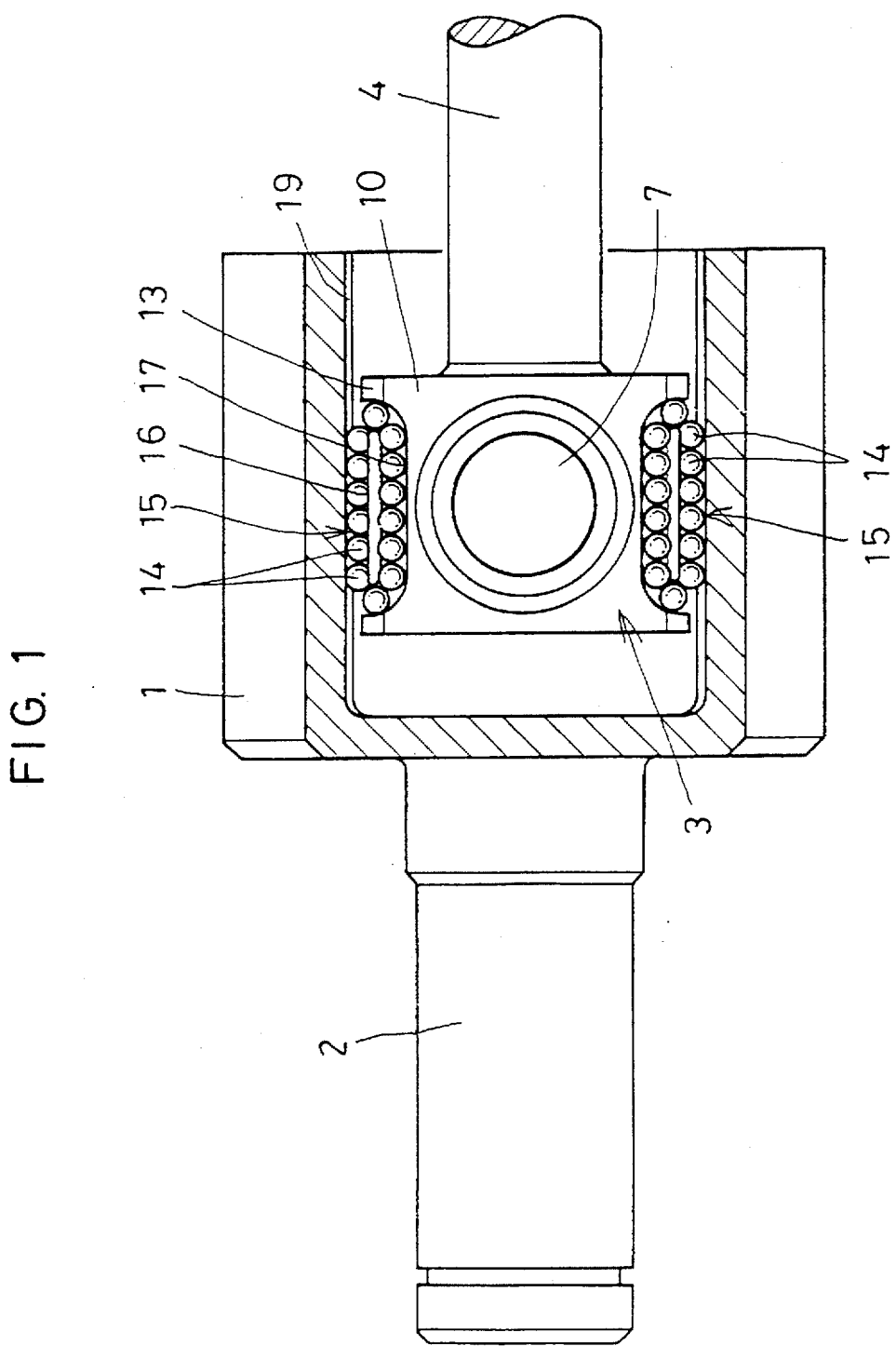
FIG. 1 is a plan view in cross-section of a homokinetic universal joint of one embodiment.
Figure 2:
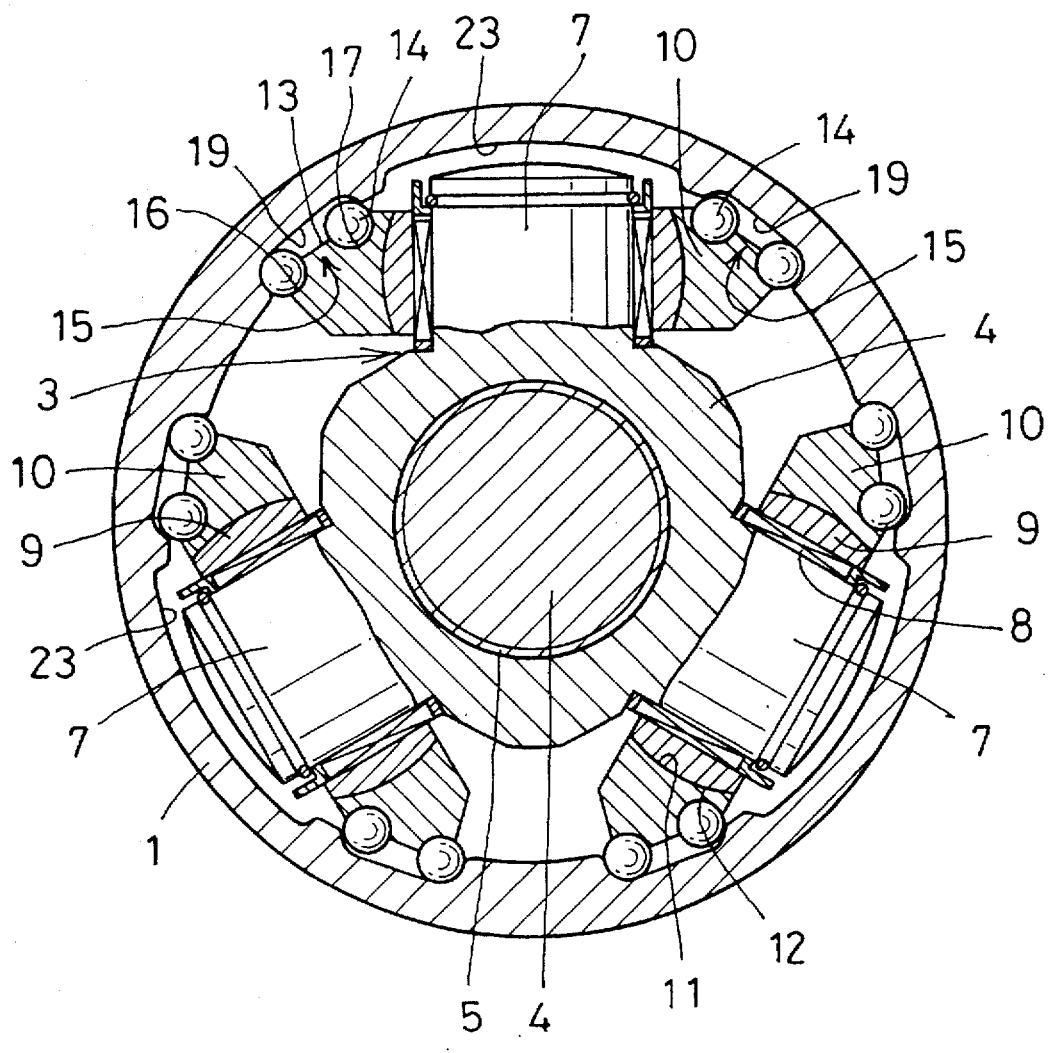
FIG. 2 is a side view in vertical section of the same.
Figure 3:
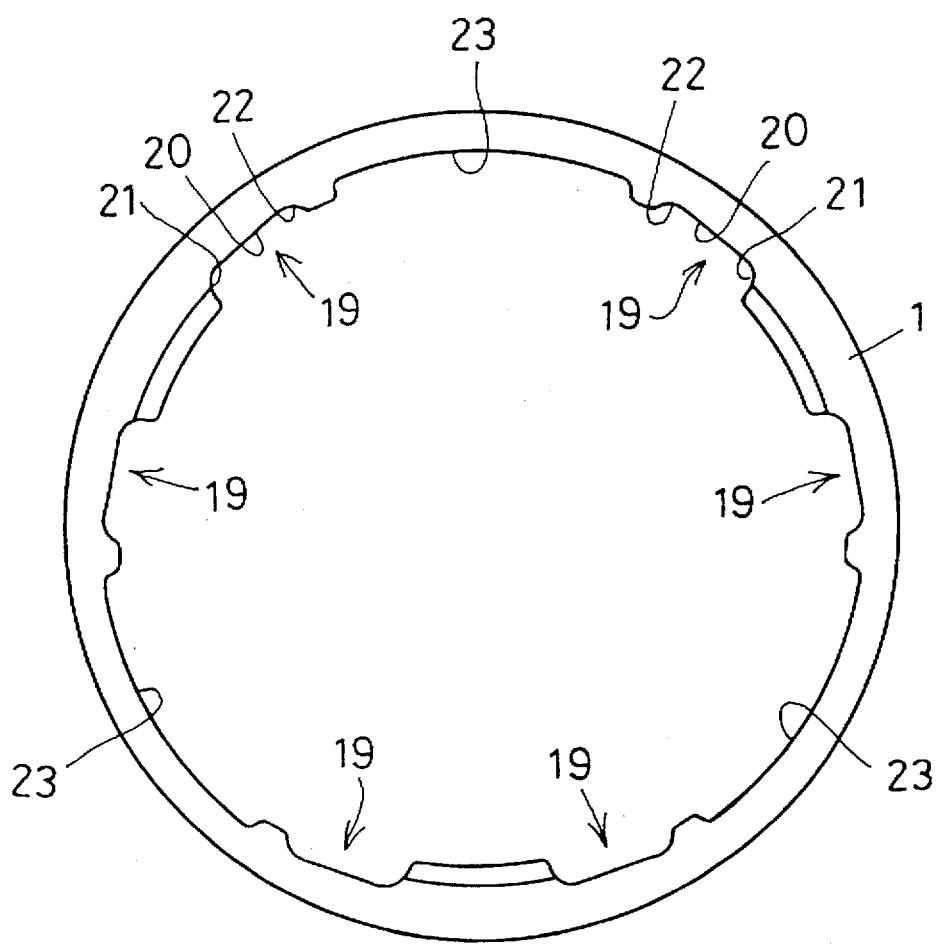
FIG. 3 is a side view of its outer ring.

FIGS. 1 and 2 show an embodiment of the homokinetic universal joint of the present invention. FIG. 3 is a side view showing the outer ring with the inner members removed from the joint.

As shown in these figures, an outer ring 1 is a cylindrical member having one end closed. A first shaft 2 is connected to the closed end.

Figure 4:
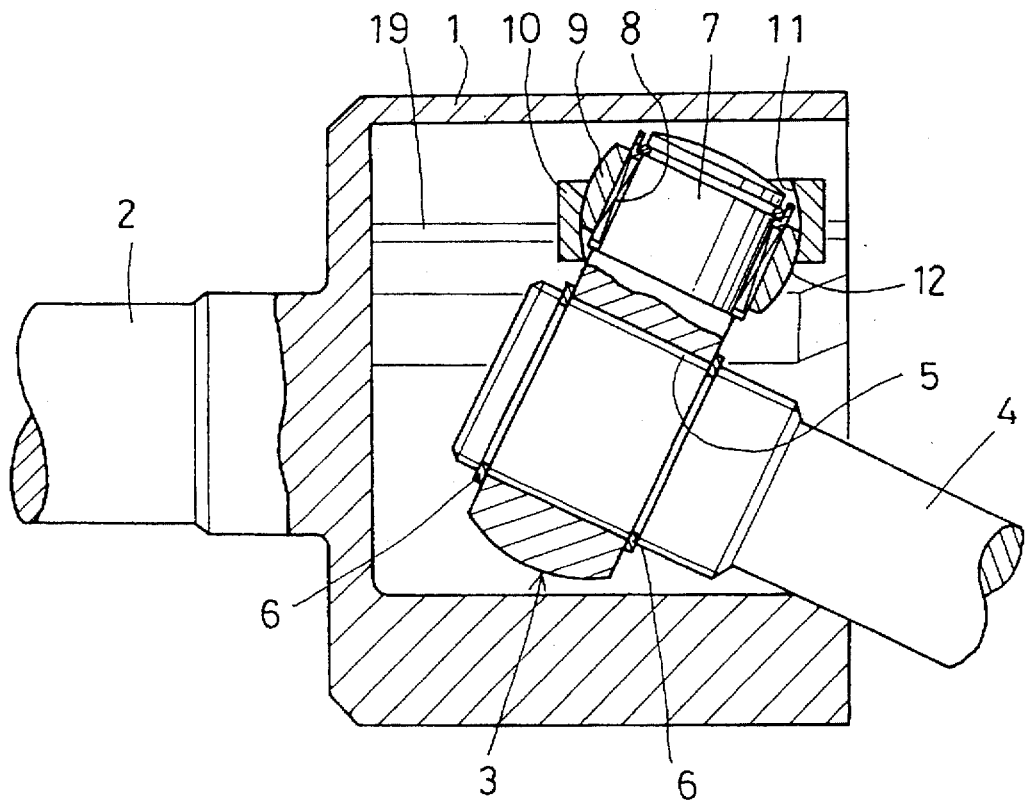
FIG. 4 is a front view in vertical section of the same showing its operational state.

A tripod member 3 is inserted in the outer ring 1. A second shaft 4 is connected to the tripod member 3 through serrations 5 so as to rotate together with the tripod member. The tripod member 3 is prevented from axial movement by retaining rings 6 put therearound (FIG. 4).

The tripod member 3 has three trunnions 7. A spherical-surfaced roller 9 is axially slidably and rotatably mounted around each trunnion 7 through needles 8. Mounted on each spherical-surfaced roller 9 is a guide block 10 having a spherical inner surface 11 which is kept in contact with and guided by a spherical outer surface 12 of the spherical-surfaced roller 9.

Each guide block 10 has flat side surfaces 13 that face the inner periphery of the outer ring 1. Formed in each flat surface 13 is a ball circulation groove 15 in which a plurality of balls 14 are received so as to be rollable with their upper half portion protruding from the groove 15. On the other hand, in the inner periphery of the outer ring 1, opposite the respective ball circulation grooves 15, are formed raceway grooves 19 that extend parallel to the axis of the outer ring. The balls 14, held between the raceway grooves 19 and the ball circulation grooves 15, are adapted to roll on a cylindrical plane whose central axis coincides with the axis of the outer ring 1.

Figure 5:
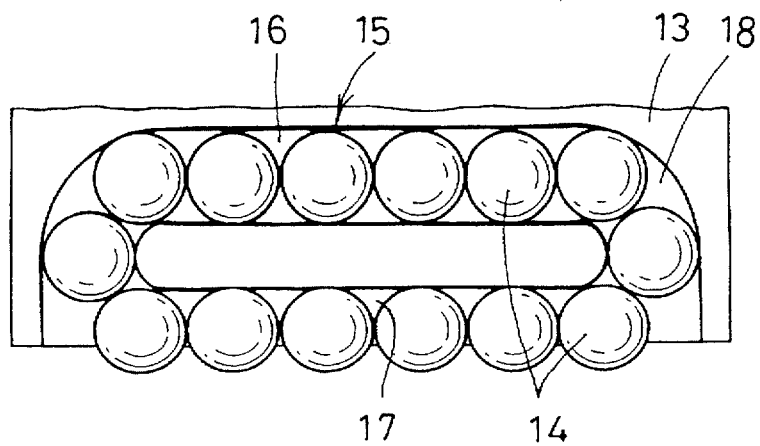
FIG. 5 is a plan view of a ball circulation groove.

As shown in FIG. 5, the ball circulation groove 15 has two straight paths 16, 17, i.e. a torque-bearing path and a ball return path. The straight paths 16 and 17 are connected at their ends by arcuate paths 18. Thus, as a whole, the groove 15 has an elliptical shape.

Figure 6:
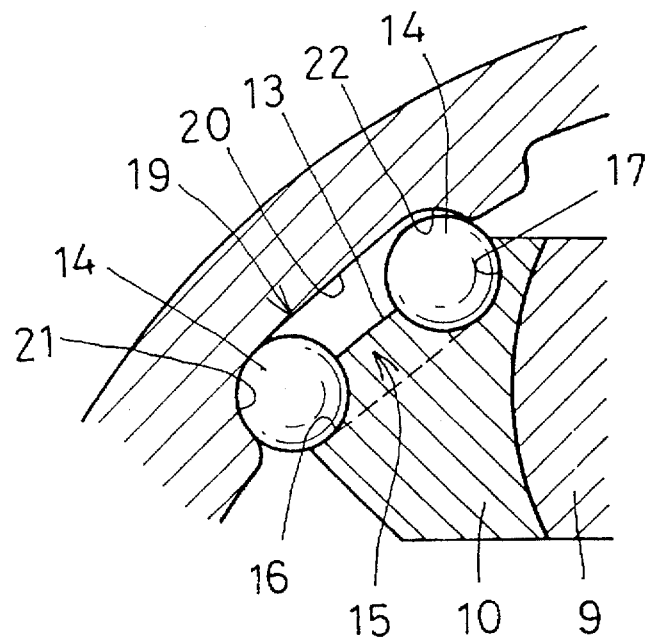
FIG. 6 is a sectional view of a ball circulation groove.

Each raceway groove 19 of the outer ring 1 has a flat bottom 20 that is slightly inclined relative to the corresponding surface 13 of the guide block 10 as shown in FIG. 6. On one side of the bottom 20 is an arcuate ball rolling surface 21 for guiding the balls 14 when they are moving in the straight load-bearing path 16. On the other side of the bottom 20 is provided a ball guide surface 22 that serves to prevent the balls 14 from dropping out while they are moving along the ball return path 17. The distance between the ball guide surface 22 and the ball return path 17 is set greater than the distance between the ball rolling surface 21 and the load-bearing path 16, so that no load acts on the balls 14 moving in the ball return path 17 while torque is being transmitted between the outer ring 1 and the tripod member 3.

Relief grooves 23 (FIG. 3) are formed in the inner periphery of the outer ring 1 to avoid interference of the outer ring 1 with the trunnions 7.

When the homokinetic universal joint of this embodiment takes a working angle, that is, when the first shaft 2 is inclined relative to the second shaft 4 as shown in FIG. 4, the trunnions 7 are inclined toward the axis of the outer ring 1. In the state shown, the guide blocks 10 are prevented from turning by the balls 14 which are between the straight load-bearing path 16 and the raceway groove 19. Also, since the guide blocks 10 and the spherical-surfaced rollers 9 are in contact with each other at their respective spherical surfaces, the rollers 9 cannot move in the axial direction of the trunnions 7.

Thus, if the trunnions 7 are inclined in this state, the spherical rollers 9 will be inclined together with the trunnions 7 while slipping relative to the guide blocks 10. If the trunnions 7 move in the axial direction with respect to the outer ring 1, slip will occur between the trunnions 7 and the spherical rollers 9.

Thus, when transmitting torque between with the joint taking a working angle, the trunnions 7 and the spherical roller 9 will pivot in the guide blocks 10, while the guide blocks 10 will move in the axial direction of the outer ring 1 keeping their horizontal state. As the guide blocks 10 move, the balls 14 will roll and circulate in the ball circulation grooves 15.

Figure 7:
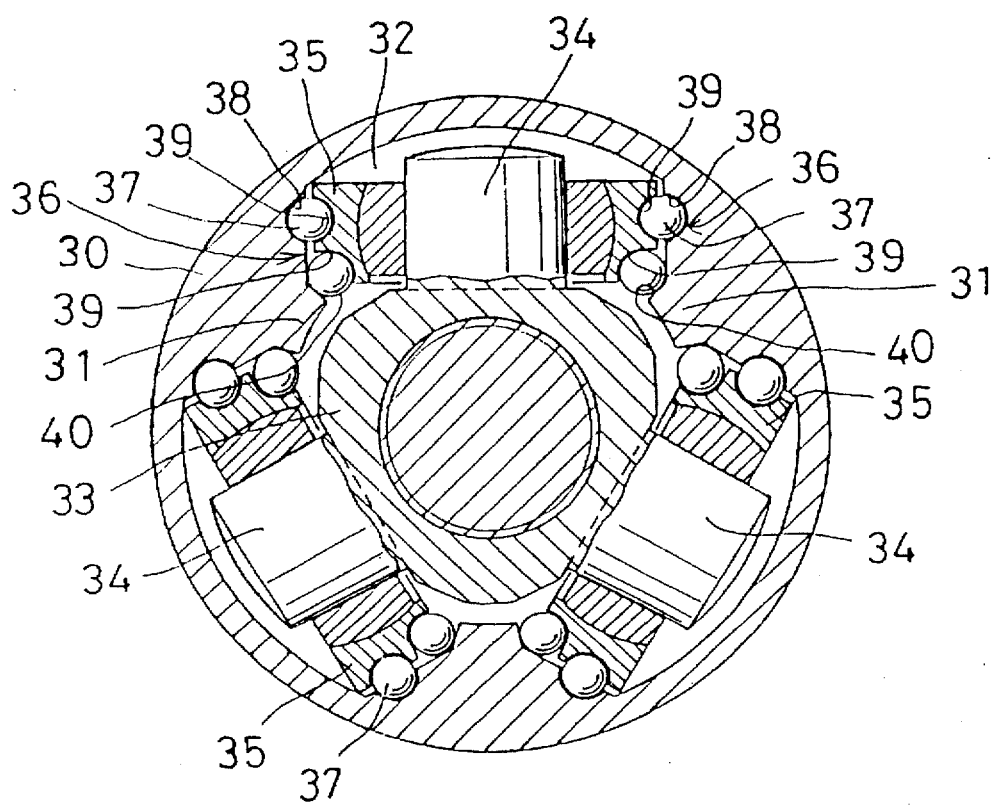
FIG. 7 is a side view in vertical section of a prior art device.

As shown in FIG. 3, the raceway grooves 19 face radially inwards. The ball rolling surface 21 formed on one side of each raceway groove 19 guides the balls 14, while the ball guide surface 22 formed on the other side prevents dropout of the balls 14. In this arrangement, there is no need to form ribs 31 that define track grooves therebetween or slopes 40 to prevent the balls from dropping out, as in the conventional arrangement shown in FIG. 7. Namely, it is possible to minimize the height of shoulders formed on the inner periphery of the outer ring 1 and thus to eliminate any sharp edges on its inner periphery. Such an outer ring 1 can be formed by forging with high dimensional accuracy.

In this embodiment, the guide blocks 10 are supported by the spherical rollers 9 mounted around the trunnions 7. But instead, guide blocks 10 having a cylindrical inner surface may be directly mounted on trunnions 7 having a spherical outer surface.

What is claimed is:

1. A homokinetic universal joint comprising a cylindrical outer ring having a cylindrical inner surface and an axis, a tripod member inserted in said outer ring and having three trunnions on an outer periphery thereof, a guide block supported on each of said trunnions so as to be pivotable about and axially slidable along the respective trunnion, said guide block having surfaces formed on both sides of the respective trunnion and facing said cylindrical inner surface of said outer ring, said outer ring being formed, in said cylindrical inner surface, with raceway grooves extending parallel to the axis of said outer ring and facing said surfaces of said guide block, each of said guide blocks being formed in each of said surfaces with a ball circulation groove accommodating a plurality of balls, each of said ball circulation grooves having two straight paths connected together at both ends by arcuate paths, said balls being guided in a direction parallel to the axis of said outer ring while in said straight paths of said ball circulation groove, one of said two straight paths in which said balls are moved under torque being located further apart from an axis of said respective trunnion than the other of said two straight paths in which the balls move under substantially no load.

* * * * *